United States Patent [19]

Tanizawa et al.

[11] Patent Number: 5,267,173
[45] Date of Patent: Nov. 30, 1993

[54] CARRIAGE RUNNING CONTROL SYSTEM

[75] Inventors: Hideichi Tanizawa, Moriguchi; Yoshitaka Watanabe, Takarazuka; Michio Iwama, Kobe, all of Japan

[73] Assignee: Daifuku Co., Ltd., Osaka, Japan

[21] Appl. No.: 775,160

[22] Filed: Oct. 11, 1991

[30] Foreign Application Priority Data

| Oct. 23, 1990 | [JP] | Japan | 2-286816 |
| Oct. 26, 1990 | [JP] | Japan | 2-289158 |
| Nov. 16, 1990 | [JP] | Japan | 2-312117 |
| Nov. 16, 1990 | [JP] | Japan | 2-312118 |

[51] Int. Cl.$^5$ .................... G06F 15/46; G06F 15/50
[52] U.S. Cl. .................... 364/478; 104/88; 180/168; 235/375; 318/587; 364/424.02
[58] Field of Search .......... 364/478, 468, 424.01, 364/424.02, 461; 104/88; 180/167, 168, 169; 318/587; 235/375, 384, 385

[56] References Cited

U.S. PATENT DOCUMENTS

| 4,379,497 | 4/1983 | Hainsworth et al. | 180/168 |
| 4,766,547 | 8/1988 | Modery et al. | 364/478 |
| 4,777,601 | 10/1988 | Boegli | 180/168 X |
| 4,780,817 | 10/1988 | Lofgren | 180/168 X |
| 4,807,140 | 2/1989 | Saulnier | 364/478 X |
| 4,817,750 | 4/1989 | Ishida et al. | 180/168 |
| 4,831,540 | 5/1989 | Hesser | 364/478 X |

FOREIGN PATENT DOCUMENTS

0328796 12/1988 European Pat. Off. .
8002013 10/1980 PCT Int'l Appl. .

OTHER PUBLICATIONS

Patent Abstracts of Japan, M field, vol. 15, No. 160, p. 121 (Apr. 22, 1991).
Patent Abstracts of Japan, P field, vol. 12, No. 431, p. 46 (Nov. 15, 1988).
European Search Report; 1991.

*Primary Examiner*—Joseph Ruggiero
*Attorney, Agent, or Firm*—Webb, Burden, Ziesenheim & Webb

[57] ABSTRACT

A carriage running control system includes a plurality of readable and writable memory media installed along a running track of carriages. Each carriage is capable of communicating information with the memory media. The running track includes special zones such as curved sections, branching sections, merging sections, and sections including stations. When a preceding carriage is present in one of such special zones, the memory medium disposed at the entry end of this zone supplies presence information to a succeeding carriage to prevent the latter from entering the zone. A detector is disposed at the exit end of each such zone for detecting departure of the carriages and resetting the memory medium at the entry end.

14 Claims, 13 Drawing Sheets

CARRIAGE RUNNING CONTROL SYSTEM

BACKGROUND OF THE INVENTION

1. Field of the Invention

This invention relates to a carriage running control system, and more particularly to a system for controlling running of carriages each having a device for communicating information with memory media installed on the ground such that, when a preceding carriage remains in a predetermined zone of a running track, a succeeding carriage is prevented from entering that zone.

2. Description of the Related Art

It has been conventional practice in an assembly line of automobile bodies or electric appliances to transport parts and unfinished products automatically by means of a plurality of carriages running on a predetermined running track with a guideline laid therealong. Generally, each of such carriages has an ultrasonic sensor to avoid striking a preceding carriage from behind.

However, this sensor usually is a directional sensor and therefore incapable of detecting a preceding carriage in a curved portion of the running track. The sensor also has the disadvantage of being vulnerable to disturbances.

To compensate for the inability of the directional sensor, a presence monitoring zone is provided in a curved portion or the like of the running track to detect any preceding carriage lying in the monitoring zone. If there is a preceding carriage in the monitoring zone, control is effected to prevent a succeeding carriage from entering the monitoring zone to avoid a rear-end collision. Japanese Patent Publication Kokai No. 1991-31062, for example, discloses a control system including detectors disposed at an entry end and an exit end of a presence monitoring zone for detecting passage of carriages, and a main controller installed on the ground for receiving detection results from the detectors and determining whether a carriage is present in the monitoring zone or not. The carriages communicate with the main controller at the entry end of the presence monitoring zone to obtain information as to whether the monitoring zone may be entered.

However, the above system involves a high equipment cost in that the detectors must be installed at two positions, i.e. the entry end and exit end of a presence monitoring zone, and these detectors must be wired to the main controller. Further, the main controller has a heavy burden with an increased number of jobs to be processed.

On the other hand, a carriage control system has been developed recently which includes rewritable memory media called ID tags installed at positions just short of stopping points, branching points and the like of carriages. The memory media store running control information such as distances to the stopping points and post-branching addresses. Each carriage has a communicating device for communicating with the storage media without making a physical contact therewith, to read the control information from the media. In this way, while running along the tracks, the carriages obtain running information as necessary at the positions where the memory media are installed.

SUMMARY OF THE INVENTION

The object of the present invention is to provide a running control system similar to the above running control system, which is used also to prevent a collision between carriages without a substantial increase in equipment cost and at the same time enabling local processing.

A carriage running control system according to the present invention controls carriages each including a communicating device for communicating information with memory media installed on the ground. When a preceding carriage is present in a predetermined zone of a running track of the carriages, a succeeding carriage is prevented from entering that zone. The predetermined zone has one of the memory media disposed at an entry end thereof, and a detector at an exit end for detecting passage of the carriages. Each carriage further includes a controller for stopping the carriage when the information read by the communicating device from the memory medium includes presence information indicating presence of a preceding carriage in the predetermined zone, and allowing the carriage to enter the predetermined zone after causing the communicating device to write presence information into the memory medium. The detector is operable upon detection of passage of the carriage to reset the presence information stored in the memory medium.

This control system has the following functions and advantages:

Each carriage reads, by means of the communication device, control information from the memory medium installed at the entry end of the zone, checks this information to determine whether a preceding carriage is present in the zone or not, i.e. whether the information includes presence information. If presence information is not found, the carriage writes its presence information into the memory medium through the communication device, and enters the zone. If presence information is included in the information read from the memory medium, the carriage stops at the entry end and waits for of the preceding carriage to leave the zone.

The detector disposed at the exit end of the zone detects departure of the preceding carriage and resets the presence information stored in the memory medium. The succeeding carriage waiting at the entry end of the zone detects elimination of the presence information, writes its presence information in the same way as if there had been no presence information, and enters the zone.

In this way, a carriage arriving at the entry end of the zone obtains, through the communication device, presence information directly from the memory medium installed on the ground. Then the carriage itself makes a decision whether to stop or enter the zone. Thus, the invention realizes local processing which lends no burden to the main controller on the ground. The communicating device which is provided as an intrinsic part of each carriage for obtaining running control information is used also for this purpose. This feature assures the above effect with a minimal increase in equipment cost.

Preferably, the memory medium installed at the entry end of the zone also stores running control information for the zone. Then the controller of each carriage effects running control based on the running control information read from the memory medium through the communication device.

This means that the memory medium installed at the entry end of the zone stores not only the presence information noted above but also the running control information applicable to the zone. In other words, the memory medium storing the running control information for the zone is used also for writing and reading the presence information.

The feature that the memory medium storing the running control information applicable to the zone is used also for communicating the presence information with the carriages produces and additional effect of checking an increase in equipment cost.

Other features and advantages of the present invention will be apparent from the following description.

BRIEF DESCRIPTION OF THE DRAWINGS

FIGS. 1 through 4 show a carriage running control system according to the present invention, in which:

FIG. 1 is a schematic view showing a layout of running tracks and stations,

FIG. 2 is a block diagram showing signal flows to and from a carriage and adjacent devices, FIG. 3 is a schematic plan view of carriages and a zone, and FIG. 4 is a block diagram showing an interior structure of a memory medium.

FIGS. 5 through 10 show a carriage running control system in another embodiment of the invention, in which:

FIG. 5 is a schematic view showing a layout of running tracks and stations,

FIG. 6 is a block diagram showing signal flows to and from a carriage and adjacent devices, FIG. 7 is a schematic plan view of a carriage, FIG. 8 is a block diagram showing an interior structure of a memory medium, and FIGS. 9 and 10 are views each showing a layout of guidelines in certain sections of the running tracks.

FIGS. 11 through 13 show a carriage running control system in a further embodiment of the invention, in which:

FIG. 11 is a schematic view showing a layout of running tracks and stations,

FIG. 12 is a block diagram showing signal flows to and from a carriage and adjacent devices, and FIG. 13 is a schematic plan view of a carriage and a branching point of guidelines.

FIGS. 14 and 15 show a carriage running control system in a still further embodiment of the invention, in which:

FIG. 14 is a schematic view showing a layout of running tracks and stations, and FIG. 15 is a flowchart of part of running control effected by a controller shown in FIG. 14.

DETAILED DESCRIPTION OF THE PREFERRED EMBODIMENTS

A carriage running control system according to the present invention will be described in detail with reference to the drawings.

Figure 1:
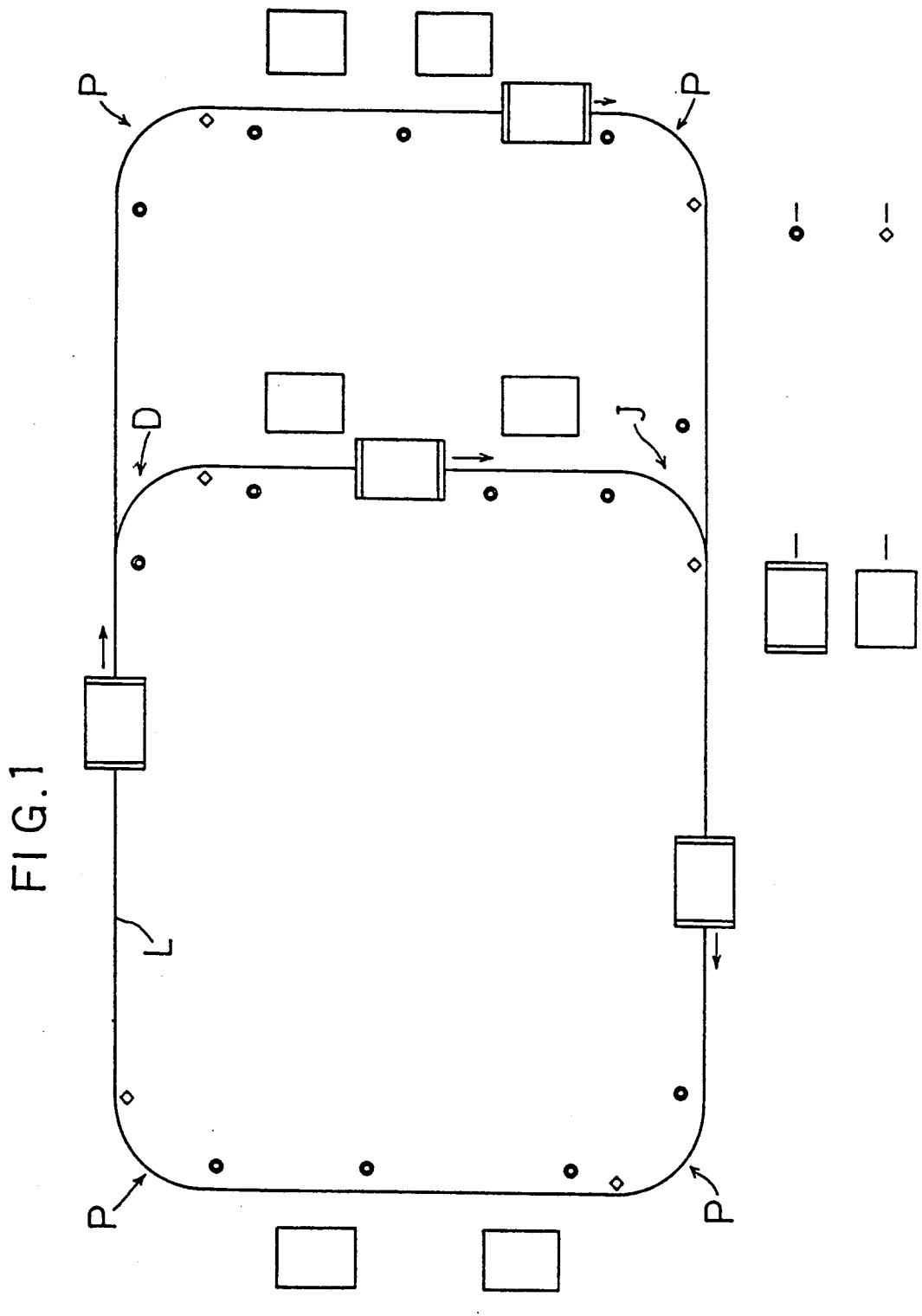

As shown in FIG. 1, this system includes guidelines L laid in loop form along running tracks of article transporting carriages A, and a plurality of stations ST arranged along the guidelines L for the carriages A to stop to load and unload the articles. The carriages A are automatically controlled to run from one station ST to another to transport the articles. FIG. 1 is a simplified illustration to facilitate understanding.

Figure 2:
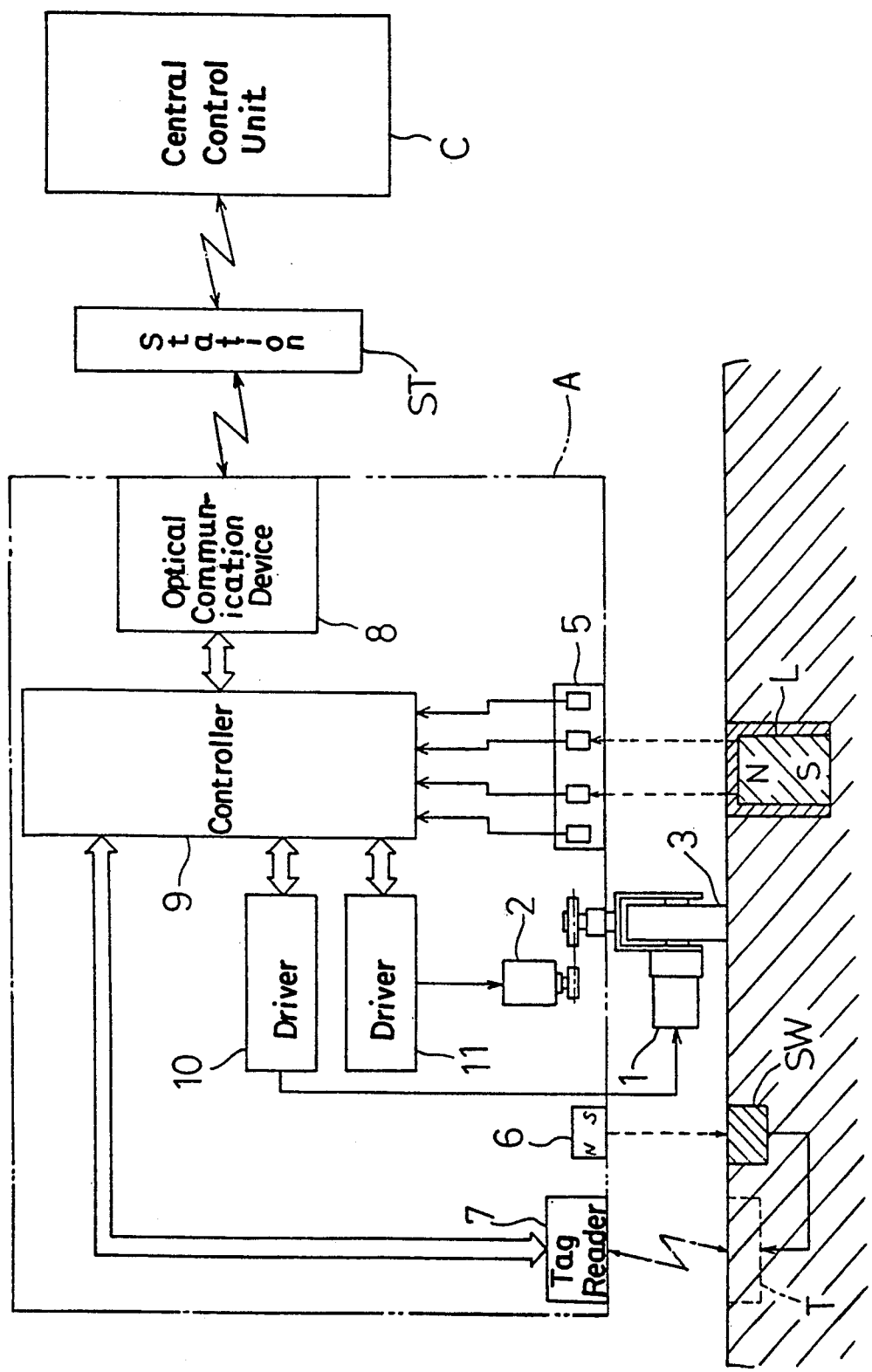

Referring to FIG. 2, each guideline L includes a magnetic member having a rectangular cross section with an N-pole on the front and an S-pole on the back, and an epoxy resin surrounding the magnetic member and fixing it in position. The guideline L is buried flush with a running track surface. As will be described later, a magnetic sensor 5 on each carriage A detects the guideline L and the carriage A steers itself to run along the guideline L.

This control system further includes memory media T called ID tags buried in running track surfaces adjacent curved sections P, a branching point D and a merging point J of the guidelines L, and adjacent the stations ST. These ID tags T store running control information such as (slow) running speeds for the curves, addresses after branching or merging, and distances to stopping positions at the stations ST. When each carriage A reaches a position where one of the ID tags T is buried, a tag reader 7 mounted on the carriage A reads the control information from the ID tag T to cause the carriage A to make a turn, branch off, run onto a merging track or stop as described later.

In order to prevent the carriages from striking preceding carriages from behind in the curved sections P, the ID tags T adjacent the curved sections P also store presence information indicating whether any carriages are present in the curved sections P. Further, lead switches SW are provided at exit ends of the curved sections P to detect passage of the carriages A and reset the presence information. These will be described in detail later.

Figure 3:
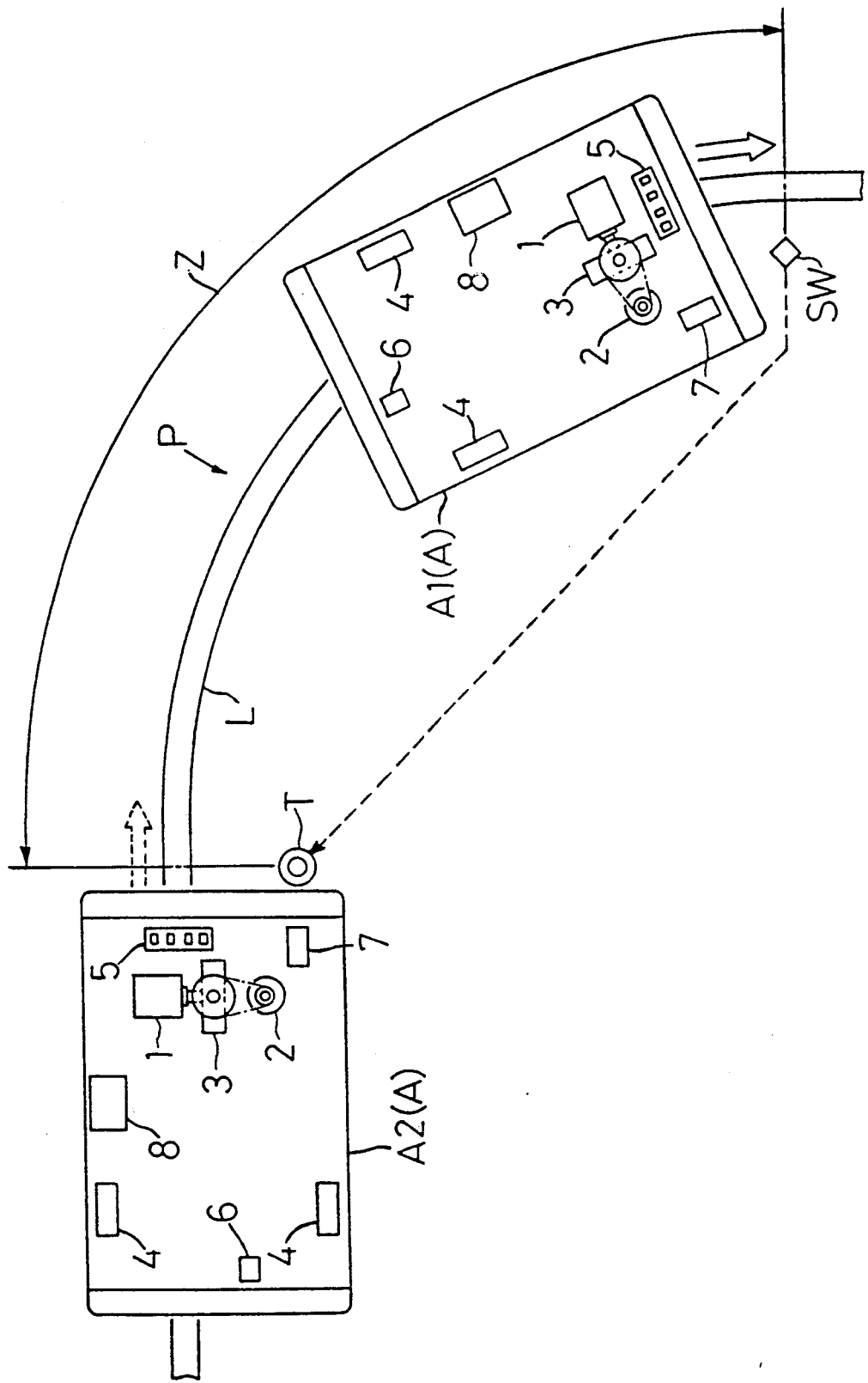

As shown in FIGS. 2 and 3 which are a block diagram and a plan view of principal parts of the system, each carriage A includes a drive motor 1 and a steering motor 2 for driving and steering a steerable drive wheel 3 attached to a forward position of the carriage A. The carriage A has a pair of right and left follower wheels 4 in rearward positions thereof. The magnetic sensor 5 is mounted forwardly of the drive wheel 3 to detect the guidelines L and obtain steering information therefrom. The sensor 5 is movable to change its facing direction in accordance with a steering direction of the drive wheel 3.

The carriage A further includes a magnet 6 mounted in a rear position thereof and in an opposed relationship with the lead switches SW provided on the running track surfaces. When the magnet 6 approaches one of the lead switches SW, a contact of the lead switch is closed. The tag reader 7 is mounted on a right forward position of the carriage A to communicate information with the ID tags T. Further, an optical communication device 8 including a light transmitter and a light receiver is mounted on a longitudinally intermediate left side position of the carriage A. Each station ST includes a similar optical communication device including a light transmitter and a light receiver disposed in a position opposed to the above communication device 8 when the carriage A stops at the station ST. Through these communication devices communications are conducted between the station ST and carriage A. Alternatively, the carriage A may communicate, using the station ST as a relay, with a central control unit C which controls an overall operation of the system. For example, when the carriage A notifies the station ST of completion of an operation at that station ST, the station ST transmits to the carriage address information of a target station where the carriage is to engage in a next operation.

The carriage A further includes a controller 9 for processing information received through the magnetic sensor 5, tag reader 7 and communication device 8 and controlling running of the carriage A, as well as a driver 10 for driving the drive motor 1, and a driver 11 for driving the steering motor 2.

As shown in FIGS. 2 and 3, the magnetic sensor 5 includes four magnetic sensor elements arranged transversely of the carriage A. These sensor elements are arranged at appropriate intervals such that the two inner elements detect the magnetism of the guideline L and the two outer elements do not when the carriage A is in a proper position relative to the guideline L, i.e. when a transversely mid-position of the magnetic sensor 5 is opposed to the center of the guideline L.

Thus, when the carriage A is displaced right or left relative to the guideline L, one of the two outer sensor elements detects the magnetism of the guideline L. In response to the resulting information on detection, the controller 9 provides a steering control to return the carriage A to the proper position.

Figure 4:
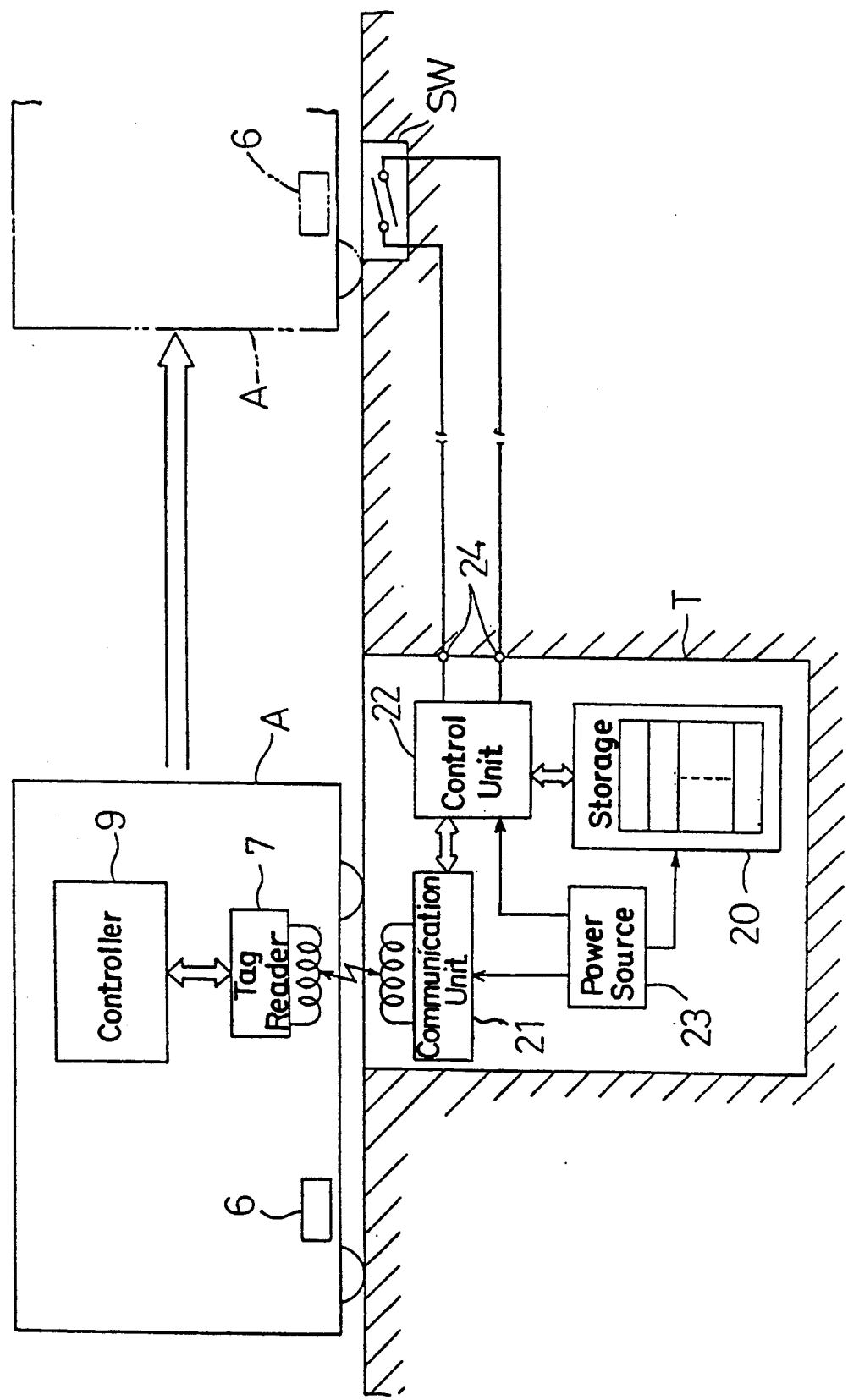

As shown in FIG. 4, the tag reader 7 communicates with the ID tags T by electromagnetic induction to effect data exchange between the controller 9 and ID tags T.

Each ID tag T, as shown in FIG. 4, includes a storage 20 having a rewritable semiconductor memory, a communication unit 21 for carrying out the communication through electromagnetic induction with the carriages A and other external devices, a control unit 22 for effecting data exchange between the storage 20 and communication unit 21, and a power source 23 having a battery. These components are mounted in a casing to constitute the ID tag T. This construction allows the information stored in the ID tag T to be maintained by the battery, and read and rewritten by the external devices in a non-contact manner. The ID tag T also includes a contact input port 24 for reading contact information from the lead switch SW to reset information (presence information) at a particular address in the storage 20, as described later. The carriage A transmits a response request signal to the ID tag T at predetermined intervals of time during its run. The ID tag T, on the other hand, is maintained in a state for receiving the response request signal transmitted from the tag reader 7.

Thus, when the carriage A approaches the position where the ID tag T is installed and the tag reader 7 is within a communicable distance to the ID tag T, the ID tag T receives the response request signal from the tag reader 7 and returns a response. Though a subsequent communication protocol is not described, a communication is now established between the ID tag T and tag reader 7 whereby the tag reader 7 reads information from the ID tag T. When necessary, writing information is transmitted from the controller 9 through the tag reader 7 to the ID tag T to be stored therein.

In this way, the carriage A, approaching a curved section P, the branching point D or other sections of the running tracks where the ID tag T is installed, reads the information needed for subsequent running from the ID tag T. Besides, a control is provided for preventing the carriage A from striking a preceding carriage from behind in special zones such as the curved sections P. This rear-end collision avoidance control will be described next.

In a curved section P or the like, as shown in FIG. 3, a predetermined zone Z is provided for avoiding a rear-end collision. While a preceding carriage A1 lies in the zone Z, a succeeding carriage A2 is controlled not to enter this zone Z. That is, the succeeding carriage A stops at an entry end of the zone Z and waits for the preceding carriage A1 to leave the zone Z through an exit end thereof.

To effect the above control, one of the ID tags T is installed at the entry end and one of the lead switches SW at the exit end of the zone Z. As noted hereinbefore, the lead switch SW has a contact closed by approach of the magnet 6 of the carriage A, thereby acting to detect passage of the carriage A.

The ID tag T uses the described running information also for this control. Specifically, referring to FIG. 4, the storage 20 stores the running information which includes information indicating that this is a curved section and specifying a running speed for the curved section, and besides the presence information may be written at a particular address in the storage 20. The control unit 22 resets the information stored at the particular address in response to the signal received at the contact input port 24. The contact of the lead switch SW is connected to the contact input port 24.

The above construction effects the rear-end collision avoidance control as follows. The carriage A in its movement toward the zone Z reads the information stored in the ID tag T installed at the entry end of the zone Z. If there is no preceding carriage in the zone Z, the approaching carriage A learns this condition from a flag indicating the presence information at the particular address set to "0". Then the carriage A transmits to the ID tag T a command to set the flag to "1", and enters the zone Z. When the contact of the lead switch SW installed at the exit end of the zone Z is closed by the magnet 6 of the carriage A, the control unit 22 of the ID tag T sets the flag to "0" (i.e. resets the presence information) in response to the contact signal received from the lead switch SW. Thus, the flag takes the value "1" when a carriage A lies in the zone Z, and the value "0" when there is no carriage in the zone Z. In other words, this flag indicates whether or not the presence information is stored in the ID tag T.

When there is a preceding carriage A1 in the zone Z as shown in FIG. 3, a succeeding carriage A2 approaching the zone Z reads the information stored in the ID tag T. Then the controller 9 learns presence in the zone Z of the preceding carriage A1 from the presence information as noted above, and stops the carriage A2 prior to entry to the zone Z. The carriage A2 waits for elimination of the presence information, while the tag reader 7, at predetermined intervals of time, checks the information stored in the ID tag T. When the preceding carriage A1 leaves the zone Z through the exit end, the presence information is reset as described above. The succeeding carriage A2 detects this, writes its presence information, and enters the zone Z.

In this way, control is effected so that two or more carriages A are not allowed to be present in the zone Z at the same time, thereby avoiding a collision of the carriages in the zone Z.

Though not shown in the drawings, a portable handy terminal having an electromagnetic induction type communication device similar to the tag reader 7 is used to write the running control information into the ID tags T. Alternatively, the running control information may be written into the ID tags T by using a vehicle programmed with an information writing operation and running along the guidelines L.

In the above embodiment, the ID tags T storing the running control information are used also for the rear-end collision avoidance control. However, it is possible to provide different ID tags for storing the running control information and for avoiding rear-end collisions.

In the above embodiment, the zones for effecting the rear-end collision avoidance control are provided in the curved sections P of the running tracks. However, the present invention is also applicable where a similar collision avoidance control is required in straight track sections including stations arranged close to one another.

In the above embodiment, each ID tag T includes a control unit for resetting the presence information in response to the contact signal input directly to the port 24 from the associated lead switch SW. A different control unit may be provided externally of the ID tag T, which receives the contact signal from the lead switch SW and transmits a command to the ID tag T to reset the presence information.

The physical structure of the guidelines L is not limited to the above embodiment. The guidelines L may be in the form of magnetic tapes applied to the track surfaces, or may be light reflecting tapes in which case each carriage A has an optical sensor instead of the magnetic sensor 5.

Another embodiment of the invention will be described hereinafter.

A running control system in this embodiment includes a supplementary guideline extending parallel to a carriage guideline with a predetermined spacing therebetween in a special section of the guideline. Each carriage has a running controller which causes the carriage within the special section to run from the guideline to the supplementary guideline and then to return to the guideline again.

Specifically, a memory medium is installed at an entry end of the special section for storing running control information that causes the carriage to run from the guideline to the supplementary guideline. The carriage includes a communication device for reading the control information from the memory medium as the carriage approaches the memory medium. Based on the running control information read by the communication device, the running controller causes the carriage to change the lines.

This running control system is useful especially when a preceding carriage is standing still in the special section and a succeeding carriage overtakes the preceding carriage in order to enhance efficiency of the entire transport equipment.

A known example of such running control is disclosed in Japanese Patent Publication Kokai No. 1988-163512. According to this prior system, a running controller of each carriage must store virtual bypass lines for all unloading stations and other special sections, or a central control unit installed on the ground must give virtual bypass line information to the carriages as necessary. In the former the running controller of each carriage must have a large storage capacity, and in the latter the central control unit has an increased number of jobs. In either case, the entire transport equipment has a reduced economic efficiency.

In addition, the above running control cannot be applied as it is when a preceding carriage, owing to a breakdown or other cause, stops at an unexpected position on a main guideline in a special section and a succeeding carriage is to move past the preceding carriage. Further, autonomous running is vulnerable to disturbances such as slipping of ground wheels, and hence inferior to guided running in accuracy of steering control.

This embodiment deals with such drawbacks of the prior art, and intends to realize a running control useful to various modes of takeover on a running track of carriages, without increasing the processing load of a running controller of each carriage or a central control unit.

This embodiment will be described in detail with reference to FIGS. 5 through 10.

Figure 5:
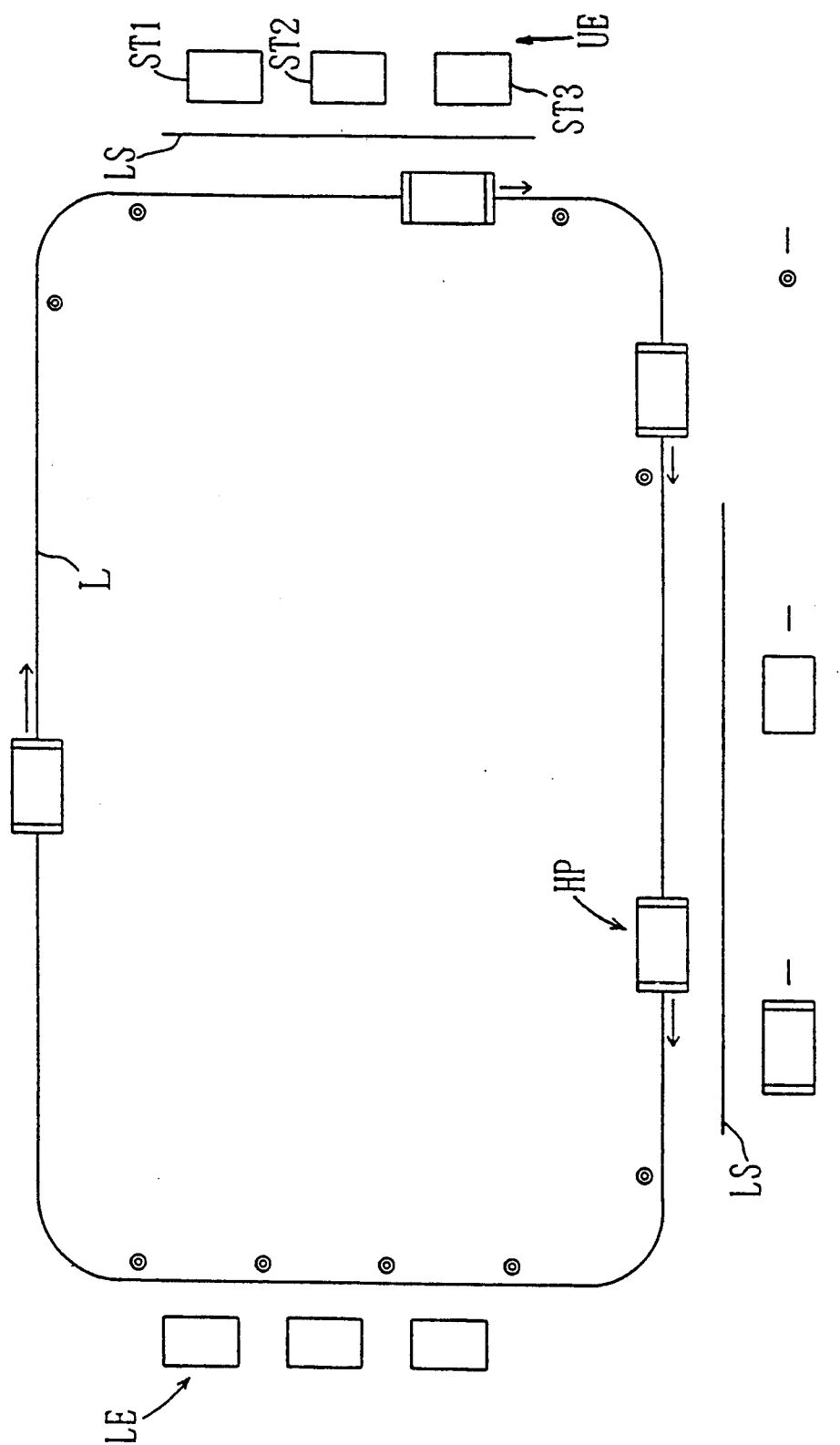
Figure 6:
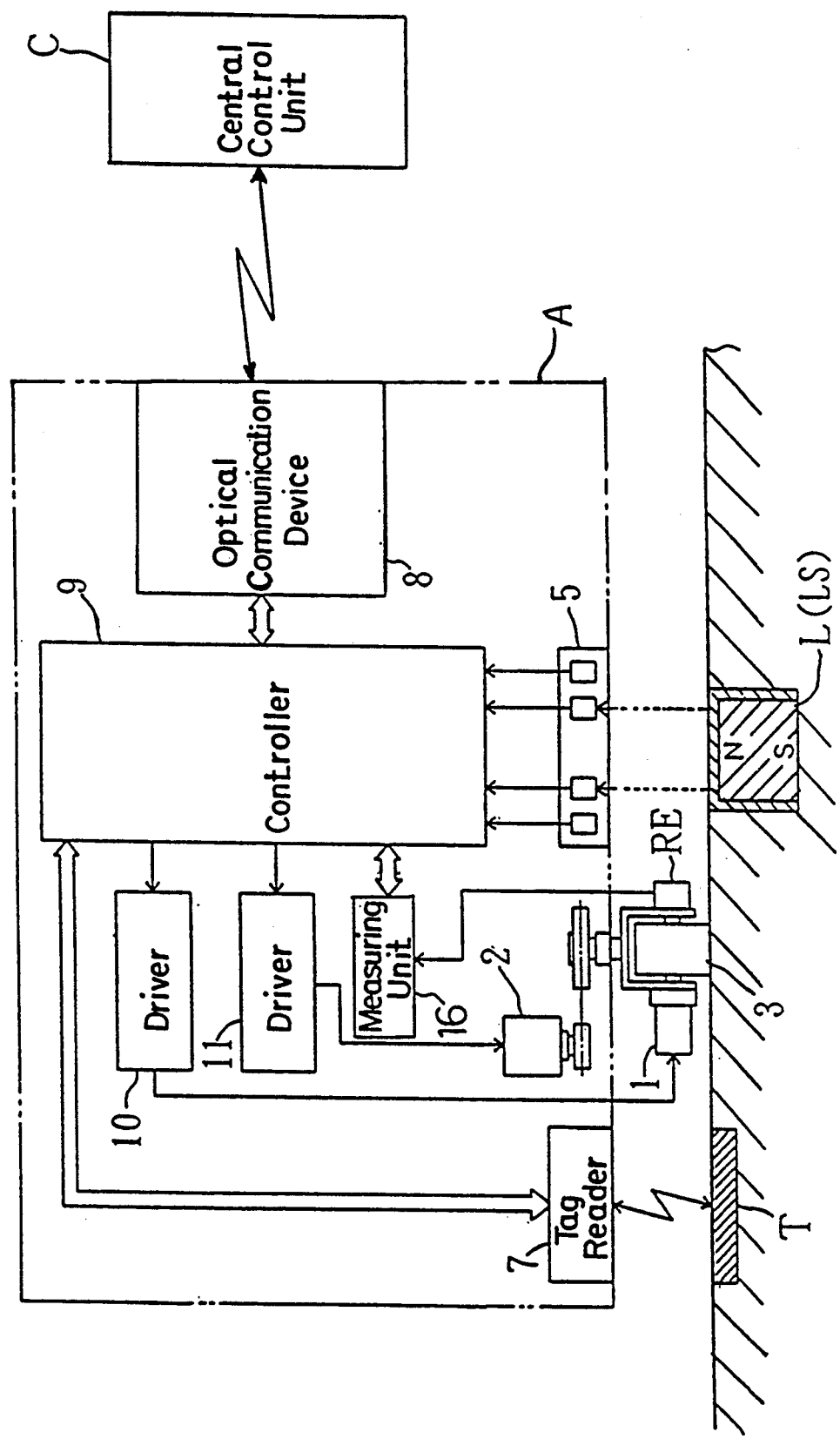
Figure 7:
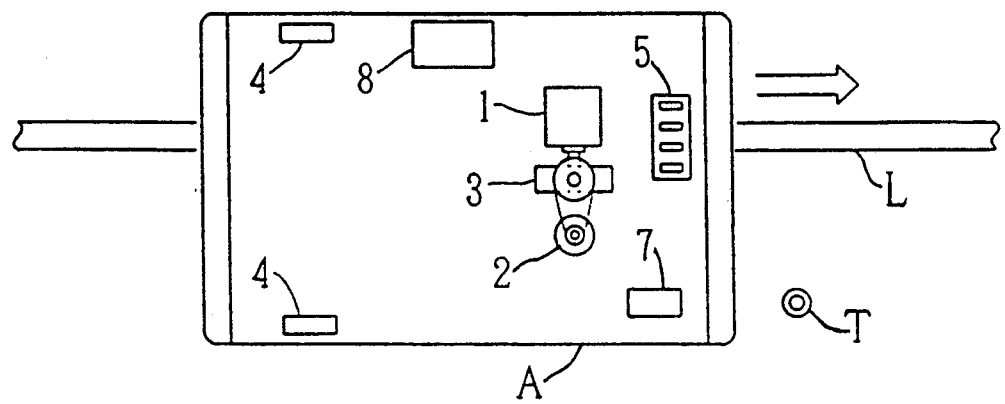

FIG. 5 shows a case in which a carriage A waiting in a standby at a home position HP receives an operational command, loads an article at one of stations ST arranged in a loading area LE at the left side of FIG. 5, carries the article to an unloading area UE at the right side, and unloads the article at one of stations ST in the unloading area UE.

Special sections of a guideline L include a section extending through the home position HP and a section in the unloading area UE. Each of these special sections includes a supplementary guideline LS extending parallel to and spaced from the guideline L. The supplementary guideline LS has the same physical structure as the guideline L. A memory medium T called an ID tag is buried in a track surface at an entry end of the special section. The ID tag T stores running control information for causing carriages A to run from the guideline L to the supplementary guideline LS and then back to the guideline L. Each carriage A reads the control information and changes the lines as necessary.

Each carriage A includes a drive wheel 3 having a rotary encoder RE for generating pulses as it rotates. Its pulse output is input to a measuring unit 16 for counting the number of pulses and converting it into a running distance.

The carriage A further includes a tag reader 7 acting as a communication unit for reading the information from the ID tag T installed in the track surface. Numeral 8 denotes a communication device such as a wireless communication device for communicating information with a central control unit C that controls an overall operation of the transport equipment. The carriage A notifies its position and condition to the central control unit C through the communication device 8, and receives an operational command including address information on a target station and the like.

As the carriage A approaches one of the ID tags T arranged along the guideline L, the information is read from the ID tag T and applied to a running controller 9. Based on this information, the controller 9 controls subsequent running of the carriage A.

As described hereinbefore, the running control information stored in each ID tag T is a combination of address information, running speed, distance information and the like, which are variable with the location of the ID tag T. Description will be made in detail here of the running control information stored in the ID tag T installed at the entry end of each special section including the supplementary guideline LS and of running control for the special section.

The special section extending through the home position HP will be described first.

As mentioned hereinbefore, one or more carriages are standing still at the home position HP, waiting for operational commands from the central control unit C. Normally an operation is assigned to foremost carriage first, but the foremost carriage could be out of order and incapable of running. In such a case, it is of advantage from the viewpoint of the efficiency of the entire transport equipment if a succeeding carriage is allowed to run past the foremost carriage without waiting for the foremost carriage to be repaired manually.

Figure 9:
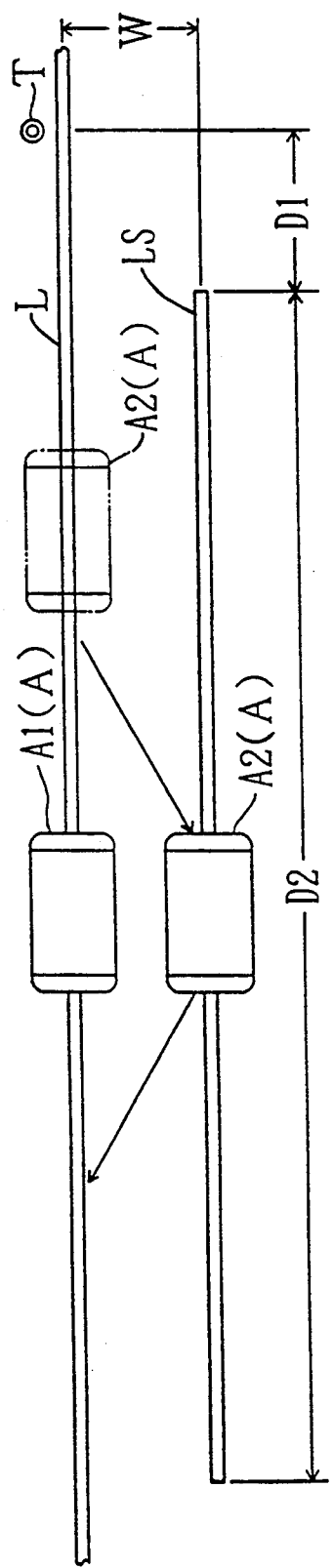

For this purpose, the special section includes the supplementary guideline LS extending parallel to and at a predetermined spacing W from the guideline L. As shown in FIG. 9, a succeeding carriage A2 runs past a preceding carriage A1 standing still on the guideline L, by moving over to the supplementary guideline LS from the guideline L short of the preceding carriage A1, and thereafter returning to the guideline L again. This line changing control is effected according to the information described hereunder.

The ID tag T installed at the entry end of the special section stores the running control information for effecting the line change. This running control information includes the three types of information shown in FIG. 9, i.e. the predetermined spacing W, a distance D1 from the ID tag T to the starting end of the supplementary guideline LS, and a length D2 of the supplementary guideline LS. As each carriage A approaches the ID tag T, the running control information is read from the ID tag T and stored at a predetermined memory address in the controller 9.

On the other hand, the carriage A is constantly aware of its running distance from the ID tag T by means of the measuring unit 16. Thus, the preceding carriage A1 notifies the central control unit C through the communication device 8 of its stopping position as information on the distance from the ID tag T. The central control unit C notifies the succeeding carriage A2 by wireless communication of the stopping information including the distance information concerning the preceding carriage A1.

The succeeding carriage A2 overtakes the preceding carriage A1 by executing a line changing run based on the above running control information, the stopping information of the preceding carriage A1 and the running distance from the ID tag T. Specifically, the controller 9 of the succeeding carriage A2, based on a calculated distance to the preceding carriage A1, effects a steering control to cause the carriage A2 to run onto the supplementary guideline LS at a position short of the preceding carriage A1 and to switch from guided running to autonomous running. When the magnetic sensor 5 detects the supplementary guideline LS, switching is made to guided running that follows the supplementary guideline LS. After running a predetermined distance, the carriage A2 is switched from guided running to autonomous running to return to the guideline L. When the magnetic sensor 5 detects the guideline L, the guided running along the guideline L is reinstated. The autonomous running between the guideline L and supplementary guideline LS is controlled on the basis of the predetermined distance W included in the running control information and steering characteristics unique to each carriage A. As a result, the carriage A, upon completion of a line change, is placed in a facing direction aligned as much as possible to the guideline L or supplementary guideline LS.

The special section provided in the unloading area UE will be described next.

Figure 10:
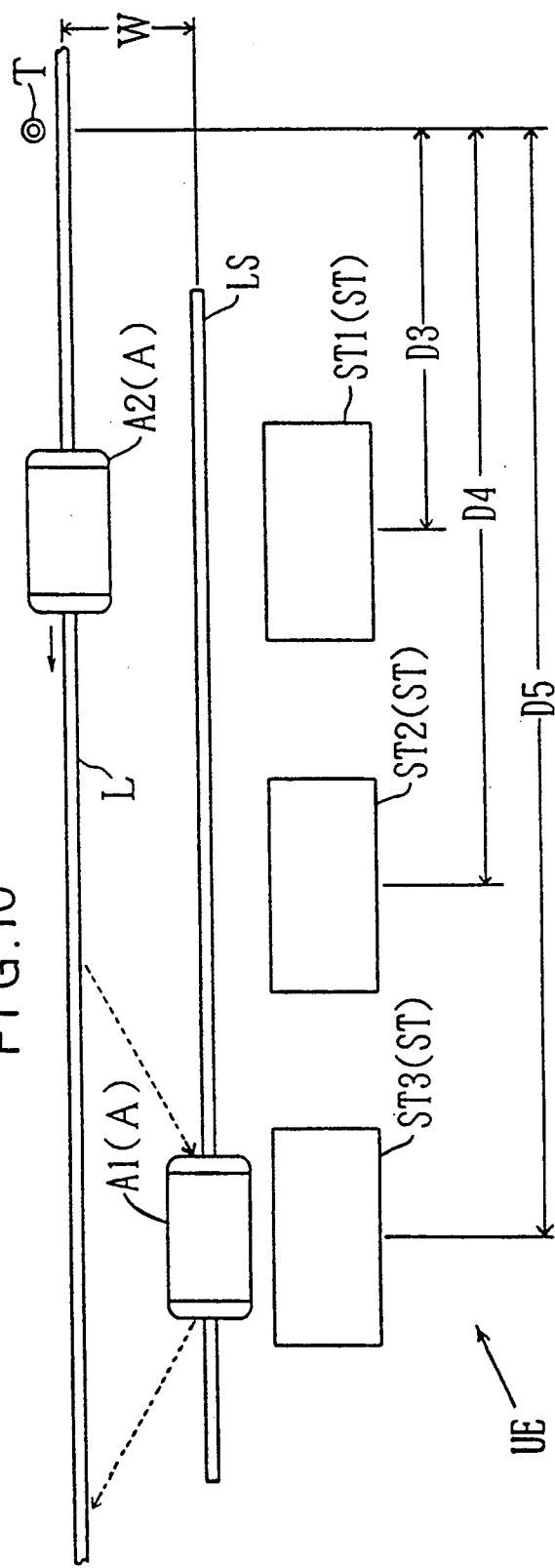

As shown in FIG. 10, this special section includes a supplementary guideline LS disposed between a plurality of unloading stations ST1, ST2 and ST3 and the guideline L, and extending parallel to and at the predetermined spacing W from the guideline L. A carriage A to engage in an unloading operation at one of the stations ST runs over to the supplementary guideline LS, stops at the target station ST, unloads the article, and thereafter runs back onto the guideline L. These operations are carried out according to the following information.

The ID tag T installed at the entry end of the special section stores the running control information for effecting the line change. This running control information includes the information shown in FIG. 10, i.e. the predetermined spacing W, and distances D3, D4 and D5 from the ID tag T to the respective stations ST1, ST2 and ST3. As each carriage A approaches the ID tag T, the running control information is read from the ID tag T and stored at a predetermined memory address in the controller 9. The carriage A carries out a line changing run based on the running control information and the running distance from the ID tag T constantly provided by the measuring unit 16, as in the special section extending through the home position HP.

For example, a carriage A1 which is to unload the article at the station ST3 is steered to run onto the supplementary guideline LS at a position derived from the running distance and the distance D5 included in the running control information, and is switched from guided running to autonomous running. When the magnetic sensor 5 detects the supplementary guideline LS, switching is made to guided running that follows the supplementary guideline LS. After running a predetermined distance, the carriage A1 is stopped at a position opposed to the station ST3. After the article is unloaded, the carriage A1 is steered to return to the guideline L and switched from guided running to autonomous running. When the magnetic sensor 5 detects the guideline L, the guided running along the guideline L is reinstated.

When the preceding carriage A1 is standing still at one of the stations ST and engaging in the unloading operation as described above, a succeeding carriage A2 may be allowed to run along the guideline L past the preceding carriage A1.

Though not shown in the drawings, a portable handy terminal having an electromagnetic induction type communication device similar to the tag reader 7 is used to write the running control information and distance information into the ID tags T. Alternatively, the running control information may be written into the ID tags T by using a vehicle programmed with an information writing operation and running along the guidelines L.

A marker may also be provided for each station ST to cause the carriages to stop at a precise stopping position. That is, a magnetic marker is installed at each stopping position, while each carriage A includes a sensor for detecting the marker. At the same time, a marker for position detecting purposes is installed rearwardly of the ID tag T at the starting end of the special section, and the running control information stored in the ID tag T includes information of distances D1–D5 from this marker. This arrangement will enable a running control with increased accuracy.

In the above embodiment, each carriage A is steered only by means of the front wheel which is a steerable drive wheel, the rear wheels being non-steerable free rotation wheels. Carriages having steerable front and rear wheels, i.e. carriages capable of sideways movement, are better suited for this type of line changing run. The carriages A may have various other constructions, and it is easy to rewrite the running control information for a line changing run in accordance with steering characteristics of the carriages.

A plurality of special sections similar to the one provided for the home position HP in the above embodiment may be arranged in selected portions of the running track. It is considered particularly advantageous to provide such a special section allowing the overtake control for an important running track having no other bypass.

Figure 12:
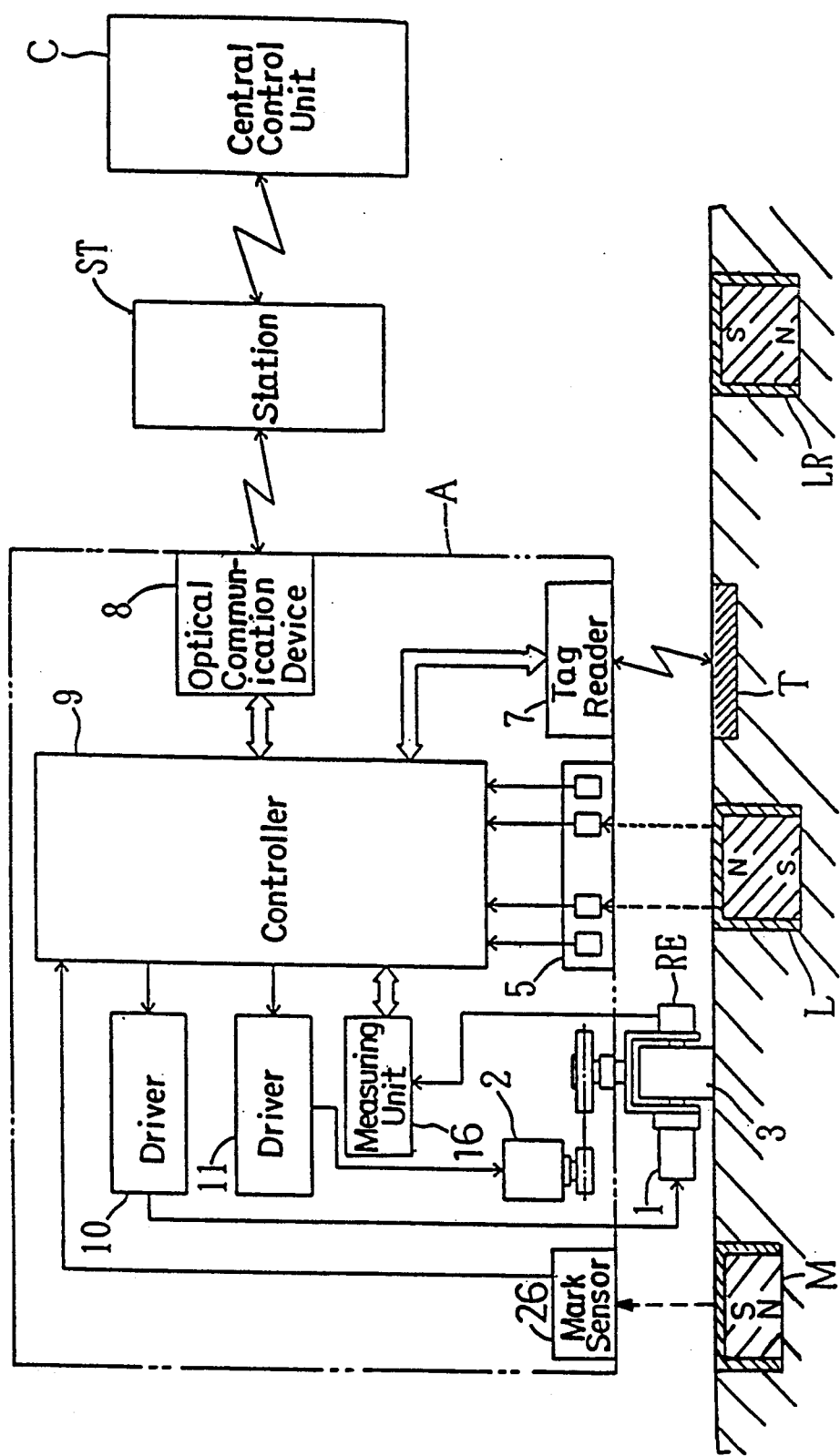
Figure 13:
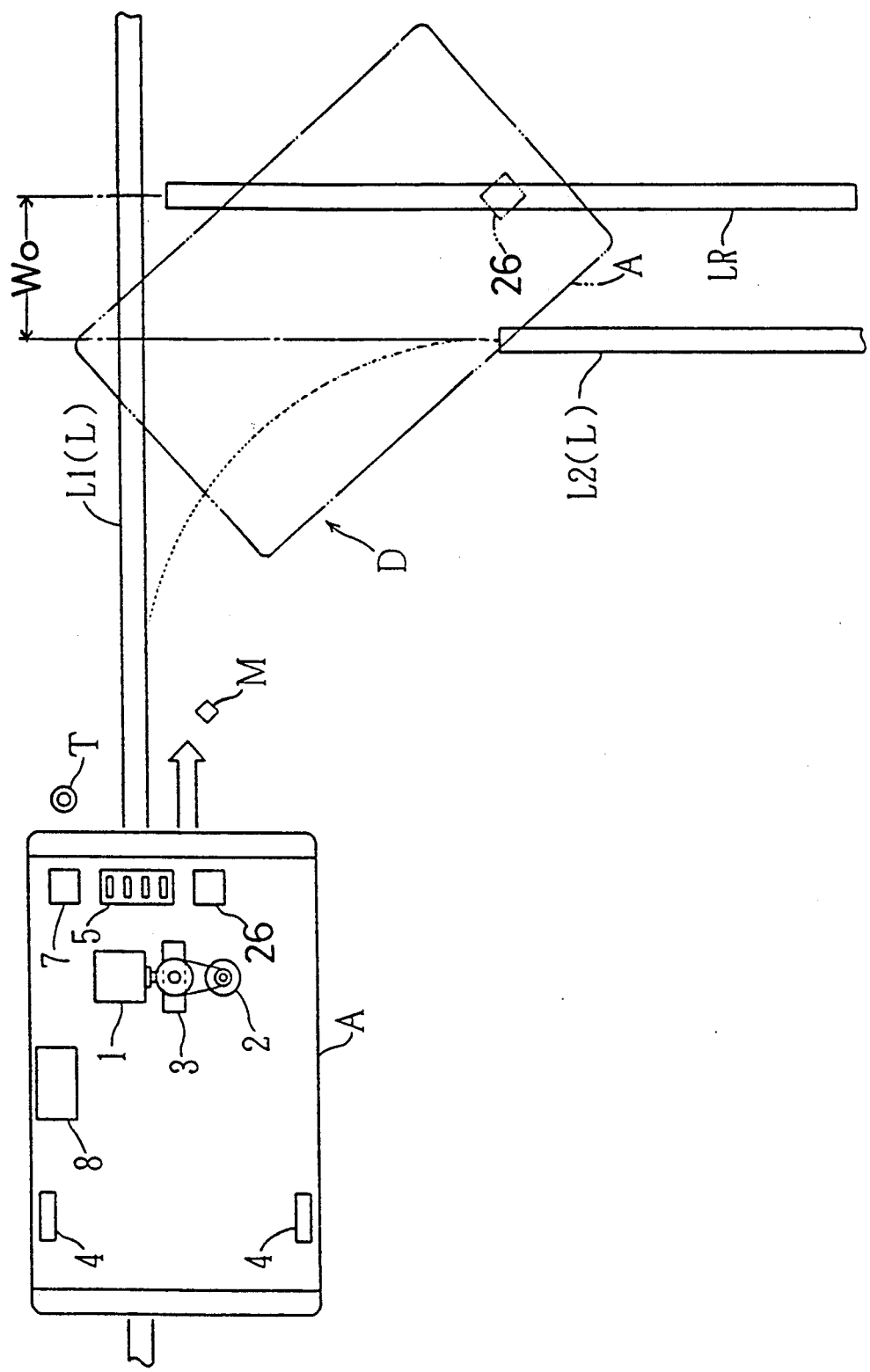

A further embodiment will be described with reference to FIGS. 11 through 13.

Figure 11:
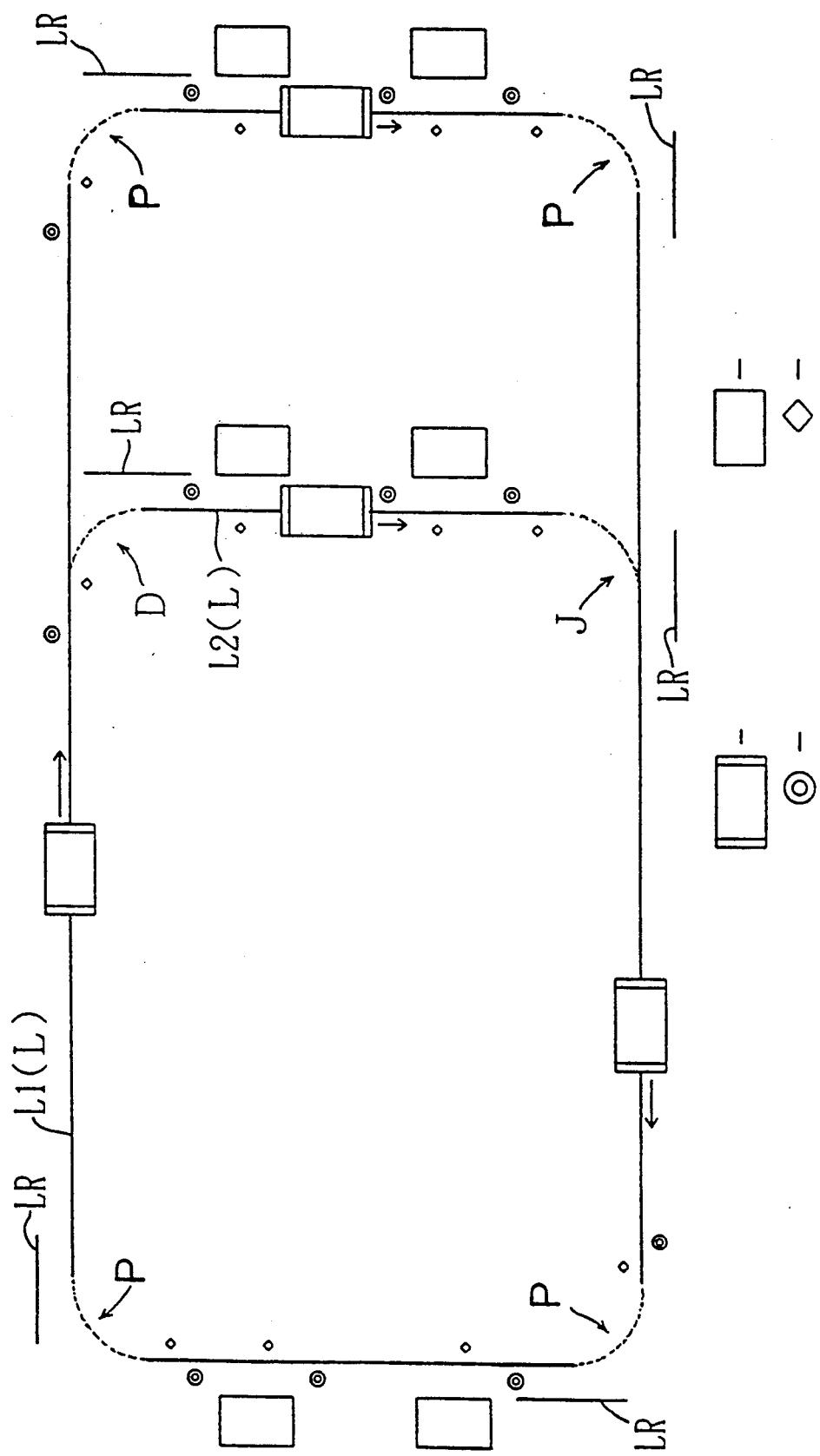

As shown in FIG. 11, guidelines L include a branching point D, a merging point J and corners P as special sections thereof, and the guidelines L are cut off in the special sections as shown in broken lines. This arrangement is adopted in order to avoid an increased equipment cost due to curved portions of the guidelines L in the special sections. In the absence of the guidelines L from the special sections, carriages A must make an autonomous run from an upstream guideline L to a downstream guideline L.

Running control information for the autonomous run is stored in memory media T called ID tags buried in upstream positions of the respective special sections P, D and J. Each carriage A reads the control information from the ID tags T for necessary control of its run. Each of the special sections includes a mark M representing a reference point for the carriages A to switch to autonomous running. The mark M comprises a magnet buried in a track surface with an S-pole facing up and an N-pole facing down. As the carriages A approach each special section, they detect the mark M after reading the control information from the ID tag T.

As shown in FIG. 11, an ID tag T is disposed upstream of each station ST also. This ID tag T stores address information of the station ST and a distance to a mark M disposed at a stopping point. As each carriage A approaches the station ST, the carriage A reads the control information from the ID tag T and determines from this information whether it should stop at that station or not. When a stop should be made, a deceleration control is effected according to the distance information, and the carriage A stops upon detection of the mark M.

As shown in FIG. 11, each of the special sections includes a restrictor line LR buried to extend parallel to and at a predetermined spacing from the downstream guideline L. The object and function of the restrictor line LR will be described later. The restrictor line LR is similar in structure to the guideline L but differs from the guideline L in that its S-pole faces up and N-pole faces down. Consequently, the carriages A detect the same magnetic pole as in the case of the marks M.

Each carriage A includes a mark sensor 26 mounted in a right forward position thereof for detecting the marks M and restrictor lines LR. The mark sensor 26 is a magnetic sensor that senses S-pole magnetism, and detects the marks M and restrictor lines LR when in close proximity thereto.

The carriage A also includes a tag reader 7 mounted in a left forward position thereof for reading the control information from the ID tags T. As described later, the tag reader 7, as it approaches each ID tag T, reads the control information in a wireless communication by electromagnetic induction with the ID tag T.

Further, a communication device 8 is mounted on a longitudinally intermediate left side position of the carriage A. This is an optical communication device 8 including a light transmitter and a light receiver. Each station ST includes a similar optical communication device disposed in a position opposed to the above communication device 8 when the carriage A stops at the station ST. Thus, the carriage A is capable of communicating information with the station ST, or through the station ST with a central control unit C which controls an overall operation of the transport system. For example, when the carriage A notifies completion of an operation at a certain station ST, a command is given to the carriage A containing address information of a target station where the carriage is to engage in a next operation.

The carriage A further includes a controller 9 for processing information received through the magnetic sensor 5, measuring device 16, mark sensor 26, tag reader 7 and communication device 8 and controlling running of the carriage A, as well as a driver 10 for driving a drive motor 1, and a driver 11 for driving a steering motor 2.

The running control information stored in the ID tag T installed in the position short of each station ST includes address information of the station ST and information on the distance to the mark M representing the stopping point.

The running control information stored in the ID tag T buried in the position short of each special section P, D or J includes the running control information for autonomous running. The ID tag T buried in the position short of the branching point D, for example, stores the following running control information:

1. Identification and address of the branching point.
2. Branching to a straight line and to a rightward branching line.
3. Distance from the mark M to a start of branching (start of autonomous running).
4. Radius of the rightward turn.
5. Running speed for the rightward turn.
6. Running speed after the branching (i.e. after running onto the downstream line).
7. Address after the branching.

The third, fourth, fifth and sixth of the above information constitute the running control information for autonomous running. The ID tag T buried short of each corner P stores all but the second of the above information.

The way in which a control is effected on the basis of the above running control information to cause the carriage A to make an autonomous run through the branching point D will be described with reference to FIG. 13.

The controller 9 of each carriage A obtains the running control information from the ID tag T through the tag reader 7 as noted hereinbefore. Then the controller 9 determines from a running track leading to a target station already input thereto and the seventh information above, i.e. the address after the branching, whether the carriage A should run straight through the branching point D or branch off rightward. If the carriage A should run straight, the controller 9 causes the carriage A just to follow the guideline L.

If the carriage A should branch off rightward, switching is made to autonomous running after the distance indicated in the third information above is run. That is, the carriage A is turned rightward at the steering angle determined by the fourth information above and at the speed specified by the fifth information.

When the magnetic sensor 5 detects the downstream guideline L subsequently, switching is made from the autonomous running to guided running along the downstream guideline L, and the carriage A continues running at the speed specified by the sixth information.

The following control is effected as a safety measure when the autonomous running is not achieved correctly under the influence of noise or the like, leading to failure to detect the downstream guideline L. The controller 9 constantly monitors the running distance measured by the measuring device 16. When the running distance after a change to autonomous running exceeds a predetermined upper limit, the controller 9 decides that movement onto the downstream guideline L has failed, and brings the carriage A to an emergency stop.

However, this method alone is insufficient as a safety measure since a correct control is impossible when the running distance is not correctly measured because of slips of the drive wheel 3 or failure of the rotary encoder RE. As a second safety measure, the restrictor line LR is provided to extend parallel to and with a predetermined downstream spacing WO to the downstream guideline L as shown in FIG. 13. As noted hereinbefore, the restrictor line LR is a magnetic line buried in the track surface with the S-pole facing upward for detection by the mark sensor 26 mounted on the carriage A. The guideline L is not detected by the mark sensor 26 since its N-pole is facing upward.

When the carriage A should run past the downstream guideline L without detecting it, the mark sensor 26 would detect the restrictor line LR. Then the controller 9 would decide that movement onto the downstream guideline L has failed, and bring the carriage A to an emergency stop.

The above twofold running safety measure is effective to avoid the danger of the carriage deviating to a large extent from the intended running track when the carriage fails in an autonomous run onto the downstream guideline L.

The running control for causing the carriage to change in an autonomous run from the upstream guideline to the downstream guideline, and the safety measure taken in the event of failure to move to the downstream guideline are effected in a similar way in the other special sections also, i.e. the merging point J and corners P, where the guideline L is cut off.

While, in the above embodiment, the running safety measure uses both the restrictor line LR and monitoring of the running distance, the safety measure may rely solely on the restrictor line LR. Alternatively, a time-out control instead of monitoring of the running distance may be used in combination with the restrictor line LR. The time-out control is a type of control that monitors, by means of an internal timer of the controller 9, lapse of time following a change to autonomous running, and determines when the time exceeds a predetermined upper limit that the change onto the downstream guideline has failed.

In the above embodiment, the carriage A is controlled to make an emergency stop immediately upon detection of the restrictor line LR. It is also conceivable to increase the steering angle upon detection of the restrictor line LR, to cause the carriage A to move quickly toward the downstream guideline L.

The physical structure of the guideline L and restrictor line LR is not limited to the above embodiment. The guideline L and restrictor line LR may be in the form of magnetic tapes applied to the track surfaces, or may be optically detectable guidelines, in which case the carriages A must of course have an optical sensor instead of the magnetic sensor 5, and an optical sensor must be used as the mark sensor 26. In any case, it is necessary for the guideline L and restrictor line LR to be distinguishable by the carriages A. In this sense, one of these lines may be magnetically detectable and the other optically detectable. Further, in the above embodiment, the mark sensor 26 is used also to detect the restrictor line LR, but a separate sensor may of course be provided to detect the restrictor line LR.

A guide sensor capable of discriminating between N-pole and S-pole may be used as the magnetic sensor 5 for following the guideline L. Such a sensor may also be used to detect the restrictor line LR.

A different embodiment will be described next.

In this embodiment, each of the memory media stores information on a distance to an adjacent memory medium. The controller of each carriage compares the distance information read through the communication device from the memory medium which the carriage approaches, and the running distance between adjacent memory media measured by the measuring device. When the two compared distances show a difference exceeding a predetermined permissible range, the controller decides that a running error has occurred.

Figure 14:
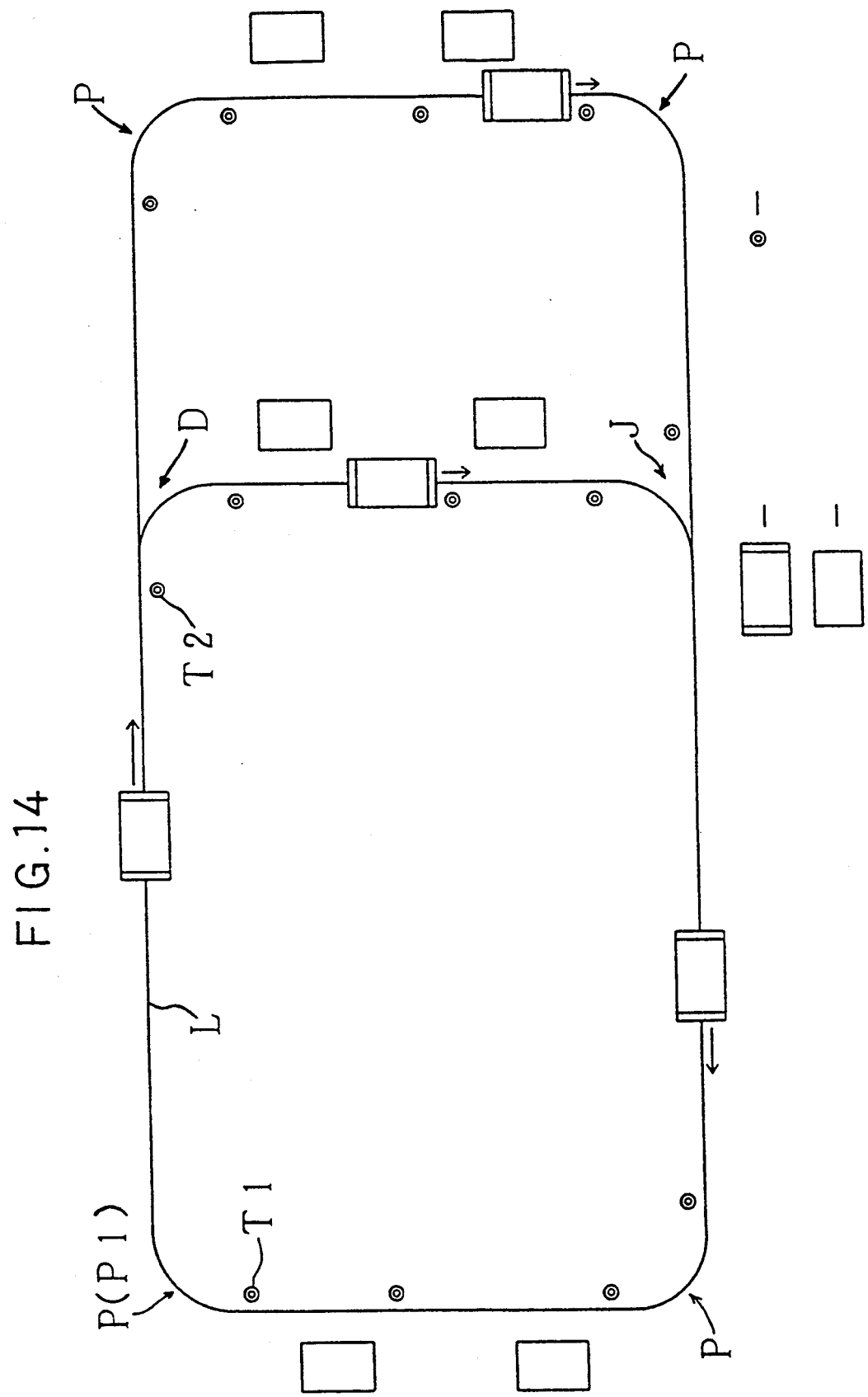

This embodiment will be described specifically hereinafter. Referring to FIG. 14, the ID tag T disposed upstream of each station ST stores running control information including an address of the station ST and a distance to a stopping point. The controller 9 first determines from this information whether the carriage A should stop at the station ST or should be allowed to run past the station ST. In the former case, the carriage A is stopped accurately and smoothly at the stopping point under deceleration control based on the information on the distance to the stopping point and the running distance from the ID tag T measured by the measuring device 6.

The ID tag T stores, along with the above running control information, information as to the distance to the adjacent ID tag T. This latter information is used for detecting a running abnormality. Wear of the drive wheel 3 or dirt on the track surface could impair correct measurement of the running distance. Trouble could occur with the rotary encoder RE, measuring device 6 or the like, which also results in an inaccurate measurement of the running distance. In such a case, the carriage A detects its own abnormality and carries out abnormality processing such as an emergency stop.

Figure 8:
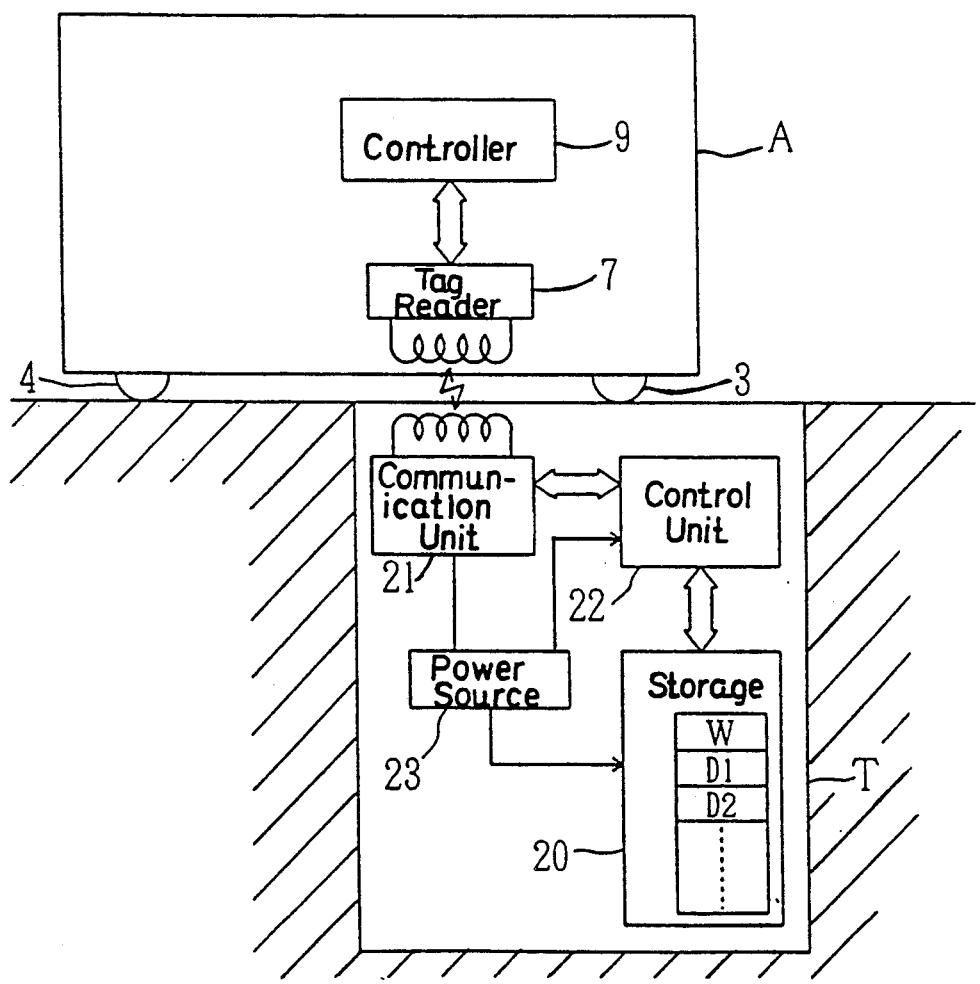
Figure 15:
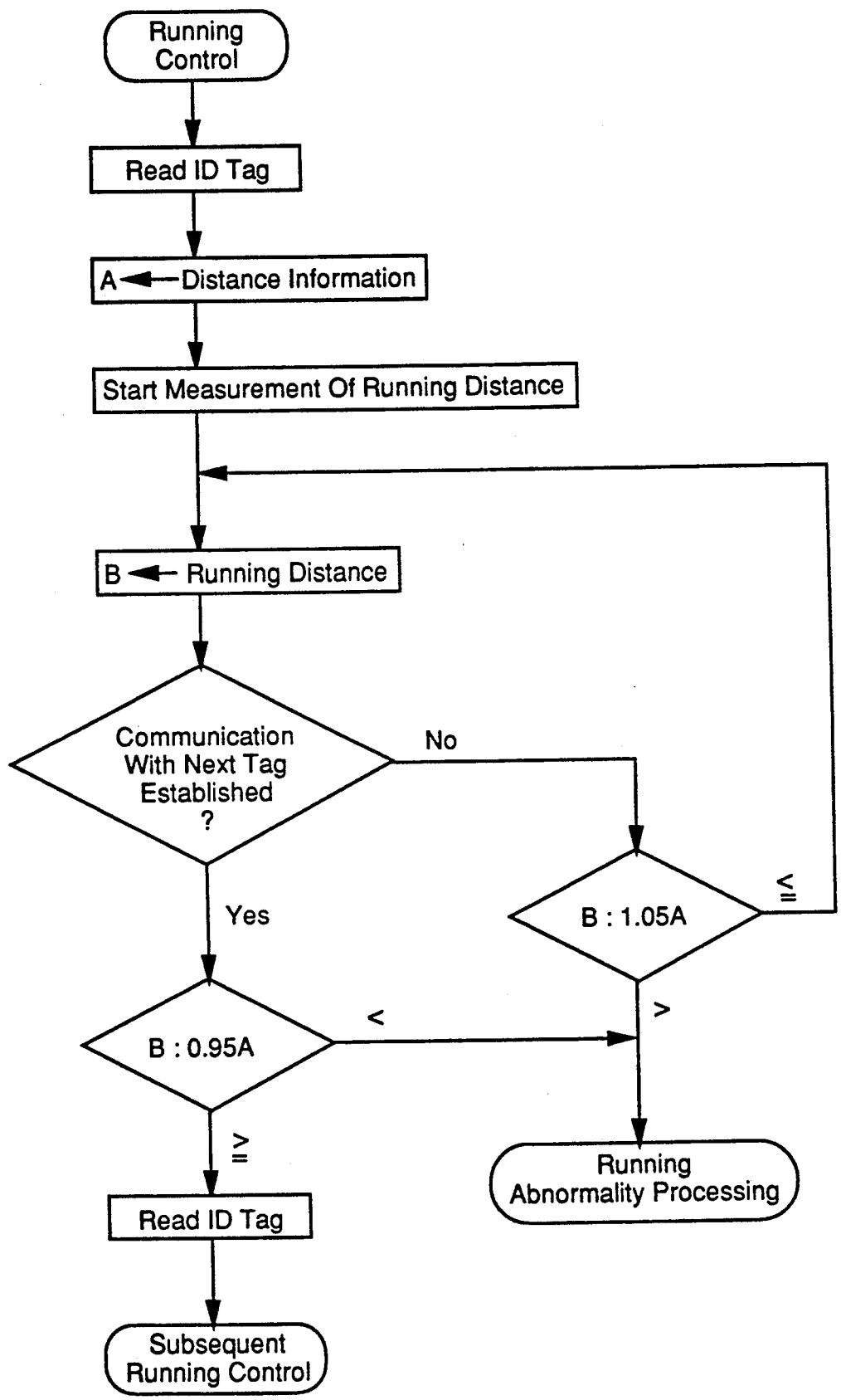

For example, an ID tag T1 disposed upstream of a curved section P1 of a guideline L in FIG. 14 has a storage 20 which, as shown in FIG. 8, stores a distance to a next tag T2 besides the running control information including an address and a running speed. The controller 9 of the carriage A detects any running abnormality on the basis of the distance information and the running distance measured by the measuring device 6. This detection sequence will be described with reference to the flowchart shown in FIG. 15.

As the carriage A approaches the curved section P1, a communication is established between the tag reader 7 and the ID tag T disposed upstream of the curved section P1. The control information is then read from the ID tag T1 and transferred to the controller 9. The controller 9 obtains from this information the distance to the next ID tag T2 and loads it into an A-register not shown. At the same time, the controller 9 resets the measuring device 6. Consequently, the measuring device 6 now measures the running distance after the carriage A passes by the ID tag T.

The controller 9 reads the running distance at predetermined intervals (about every 50 milliseconds) and loads it into a B-register not shown. If the value of the B-register (running distance) exceeds the value of the A-register (distance from ID tag T1 to ID tag T2) plus 5% before establishment of a communication with the next ID tag T2, the controller 9 determines that a running abnormality has occurred, and moves on to running abnormality processing. In the running abnormality processing, the carriage A is brought to an emergency stop and an alarm lamp (not shown) is flashed.

The controller 9 determines that a running abnormality has occurred and moves on to running abnormality processing also when the value of the B-register is less than the value of the A-register minus 5%. In other instances, the running is regarded as normal, the control information is read from the ID tag T2, and a next running control is executed based on this information.

As noted above, when the difference between the distance information and the running distance exceeds plus/minus 5%, the controller 9 determines that a running abnormality has occurred. The running abnormality here includes, in addition to a running abnormality in a broad sense which is due to wear of the drive wheel 3 or dirt on the running track, an abnormality due to incapability of a correct measurement of the running distance caused by failure of the rotary encoder RE, measuring device 6 or the like. The cause of an abnormality is found through subsequent checking by inspecting personnel.

The carriage A makes a slight zigzag movement when automatically running along the guideline L. In the curved sections the drive wheel 3 describes a locus slightly deviating from the guideline L. Therefore, a standard carriage having its running system properly maintained is actually run for measurement purposes when determining the distance information to be stored in the ID tag T1, i.e. the distance to the ID tag T2.

The running control information stored in the ID tag T2 installed just short of the branching point D includes branching control information such as addresses for the two branched tracks. The distances to the next ID tags T from which the carriages A read information while running on the respective branched tracks are usually different. Therefore, the ID tag T2 adjacent the branching point D stores information of the two different distances for the respective branched tracks.

Though not shown in the drawings, a portable handy terminal having an electromagnetic induction type communication device similar to the tag reader 7 is used to write the running control information and distance information into the ID tags T. Alternatively, the running control information may be written into the ID tags T by using a vehicle programmed with an information writing operation and running along the guidelines L.

In the above embodiment, plus/minus 5% is set as the permissible error between the distance information and running distance, which is used in determining occurrence of a running abnormality. This reference value may be varied according to track surface conditions and the like.

Further, the ID tags T may store minimum and maximum permissible values as part of the distance information. In this case, occurrence of a running abnormality is determined by checking whether the running distance is within the range between these values or not.

The physical structure of the guidelines L is not limited to the above embodiment. The guidelines L may be in the form of magnetic tapes applied to the track surfaces, or may be light reflecting tapes in which case the carriages A have an optical sensor instead of the magnetic sensor 5. The carriages A may be caused to run autonomously in this embodiment also.

What is claimed is:

1. A carriage running control system comprising:
a plurality of carriages;
a zone included in a running track of the carriages;
at least one memory medium installed on the ground adjacent an entry end of said predetermined zone, said memory medium being a read-write memory medium for reading and writing information;
detecting means disposed adjacent an exit end of said predetermined zone for detecting passage of each said carriage;
each said carriage including:
communication means for communicating the information with said memory medium, and
control means for controlling running of said carriages based on the information read by said communication means;
wherein said control means stops each said carriage when the information read by said communication means includes presence information indicating the presence of a preceding carriage in said predetermined zone while said control means otherwise allows said carriage to enter said predetermined zone after causing said communication means to write presence information into said memory medium, with said control means resetting said presence information when passage of the carriage is detected by said detecting means.

2. A carriage running control system as claimed in claim 1, wherein said memory medium is constructed to store running control information applicable to said predetermined zone.

3. A carriage running control system as claimed in claim 2, wherein said control means effects running control based on said running control information read from said memory medium.

4. A carriage running control system as claimed in claim 1, wherein said carriages run along a guideline.

5. A carriage running control system as claimed in claim 4, wherein said guideline is in loop form, and comprises a magnetic member having a rectangular cross section with an N-pole disposed on a front thereof and an S-pole disposed on a back, said magnetic member being surrounded by an epoxy resin flush with a track surface.

6. A carriage running control system as claimed in claim 4, further comprising a supplementary guideline extending parallel to and spaced from a predetermined section of said guideline, said control means effecting a line change control for causing the carriage to run from the predetermined section of said guideline to said supplementary guideline.

7. A carriage running control system as claimed in claim 6, wherein said control means executes the line change control for causing the carriage to return to the predetermined section of said guideline after running from the predetermined section of said guideline to said supplementary guideline.

8. A carriage running control system as claimed in claim 7, wherein said memory medium stores running control information for allowing execution of said line change control, said communication means reading said running control information from said memory medium as the carriage approaches said memory medium, said control means executing said line change control based on said running control information read by said communication means.

9. A carriage running control system as claimed in claim 4, wherein each of said carriages is controllable to follow said guideline and to run autonomously in predetermined sections of said guideline from an upstream guideline to a downstream guideline.

10. A carriage running control system as claimed in claim 9, further comprising safety means for use when each carriage fails to run onto said downstream guideline.

11. A carriage running control system as claimed in claim 10, wherein said safety means includes a restrictor line, a sensor mounted on each said carriage for sensing said restrictor line and said control means, said restrictor line distinguishable from said downstream guideline and extending substantially parallel to and spaced, in a downstream direction with respect to a running direction along said upstream guideline, from said downstream guideline, said control means determining from detection by said sensor of said restrictor line that the carriage has failed to run onto said downstream guideline.

12. A carriage running control system as claimed in claim 11, wherein said guideline is a magnetic line having one of magnetic poles to be detected, and said restrictor line is a magnetic line having the other magnetic pole to be detected.

13. A carriage running control system as claimed in claim 3, wherein each of said carriages further includes measuring means for measuring a running distance based on a rotating rate of a ground wheel of the carriage.

14. A carriage running control system as claimed in claim 13, wherein said memory medium stores distance information indicating a distance to an adjacent memory medium, said control means determining that a permissible error is exceeded by a difference between said distance information read by said communication means as the carriage approaches said memory medium and said running distance measured by said measuring means as the carriage runs from said memory medium to said adjacent memory medium.

* * * * *